United States Patent [19]

Laforge et al.

[11] Patent Number: 4,653,320
[45] Date of Patent: Mar. 31, 1987

[54] APPARATUS FOR MEASURING AND DISPLAYING THE SPEED OF A CRAFT, ESPECIALLY OF A SAILBOARD

[76] Inventors: Eric Laforge, 5, rue Maison-Rouge; Jean-Daniel Carrard, Gravelines, both of 1400 Yverdon, Switzerland

[21] Appl. No.: 769,981

[22] PCT Filed: Dec. 19, 1984

[86] PCT No.: PCT/CH84/00199
§ 371 Date: Aug. 21, 1985
§ 102(e) Date: Aug. 21, 1985

[87] PCT Pub. No.: WO85/02910
PCT Pub. Date: Jul. 4, 1985

[30] Foreign Application Priority Data

Dec. 22, 1983 [FR] France ................ 83 20750

[51] Int. Cl.$^4$ .............................. G01C 21/10
[52] U.S. Cl. .......................... 73/185; 73/187
[58] Field of Search .............. 73/185, 187, 189

[56] References Cited

U.S. PATENT DOCUMENTS

| 4,159,644 | 7/1979 | Svala | 73/187 |
| 4,507,960 | 4/1985 | Hufnagel et al. | 73/187 |
| 4,535,626 | 8/1985 | Wakayama | 73/185 |
| 4,586,374 | 5/1986 | Saynjakangas | 73/187 |

FOREIGN PATENT DOCUMENTS 0095040 11/1983 European Pat. Off. .

Primary Examiner—Donald O. Woodiel
Attorney, Agent, or Firm—Frost & Jacobs

[57] ABSTRACT

An apparatus for measuring and displaying the speed of a craft, especially of a sailboard, comprises on one hand an immersed rotator (1) equipped with a permanent magnet and attached to the craft (40) and on the other hand a measuring device mounted on the craft. The measuring device comprises a coil having a very large number of turns, at least one operational amplifier and a frequency meter for determining the frequency of rotation of the magnetic field produced by the magnet of the rotator (1). A sealed box (30) encloses the entire measuring device, its liquid crystal display unit and photovoltaic cells for its power supply. The apparatus is particularly adapted to be removably mounted on a sailboard or a light dinghy.

9 Claims, 6 Drawing Figures

APPARATUS FOR MEASURING AND DISPLAYING THE SPEED OF A CRAFT, ESPECIALLY OF A SAILBOARD

SUMMARY OF THE INVENTION

The present invention relates to an apparatus for measuring and displaying the speed of a craft, especially of a sailboard, comprising an immersed rotator which is pivotally mounted and arranged to be drawn by the craft, at least one permanent magnet integral with the rotator, its poles being diametrally opposite each other with respect to the axis of rotation of the rotator, and a measuring device equipped with a display unit and arranged to be mounted on the craft.

Various types of known rotator logs for measuring and displaying the speed of a craft are connected to a speed indicator on board the craft by means of a mechanical or electrical transmission line. In this type of apparatus, the transmission line passes through the hull of the craft and this leads to sealing problems and more difficult upkeep. To meet this problem, an apparatus has been designed wherein the rotator is integral with a permanent magnet whose rotating field induces, across a hull of non-ferromagnetic material, a voltage in one or two coils mounted within the hull, that is to say at a relatively great distance from the magnet.

In an apparatus of this type described in U.S. Pat. No. 4,159,644, magnetic field variations are detected by a combination of two magnetometers with alternating current excitation. In the presence of a magnetic field, a voltage is obtained at the magnetometer output, whose amplitude and polarity represent the difference between the axial field components in the two magnetometers. This device allows detection of the frequency of rotation of the magnet by eliminating stray effects of magnetic fields whose components are simultaneously equal in the two magnetometers, for example the terrestrial field. In this embodiment, this complex device is necessary to detect the field variations of the magnet at a sufficient distance and when the latter rotates at slow speed. The magnetic field intensity in fact decreases so rapidly with increasing distance that these variations cannot be detected reliably by conventional induction coils at distances in the order of a decimeter and with relatively low frequencies.

This apparatus thus comprises relatively complicated and costly detecting means. It must moreover be excited with alternating current which is generally not available on a light dinghy, and certainly not on a sailboard.

The object of the present invention is to provide a simple and inexpensive apparatus which is preferably removably mounted and allows measurement and display of the speed of a craft having no electrical energy source, especially a sailboard, and which requires no electrical or mechanical transmission, nor piercing of the hull.

This object is achieved in accordance with the invention by an apparatus of the above mentioned type which is characterized in that the measuring device comprises a coil arranged to induce an electrical signal representing the magnetic field variations generated by rotation of the magnet, at least one amplifying device arranged to amplify the signal while eliminating very low frequencies, and a frequency meter for determining the frequency of the signal after amplification.

This coil should comprise at least 2,000 turns in order to provide a sensitivity which is sufficient for slight magnetic field variations.

According to a preferred embodiment, the apparatus comprises a source of continuous current consisting of photovoltaic cells and the display unit is of the liquid crystal type.

The rotator is preferably made of a synthetic material and the magnet is accommodated within the rotator.

As no external, mechanical or electrical connection is necessary for this measuring device, particularly if it is powered by long-life cells or photovoltaic cells, the apparatus may comprise a sealed box having a transparent window and enclosing the entire measuring device, including the continuous current source. Built in miniaturized form, this box may be removably mounted on the craft by attaching means allowing rapid fixation, and may thus be taken away by the user on leaving the craft. According to another variant of the assembly, the box may be flush mounted in the upper part of a sailboard structure.

The present invention and its advantages may be more fully understood with reference to the examples of preferred embodiments described below and to the accompanying drawings.

DESCRIPTION OF THE PREFERRED EMBODIMENTS

Figure 1:
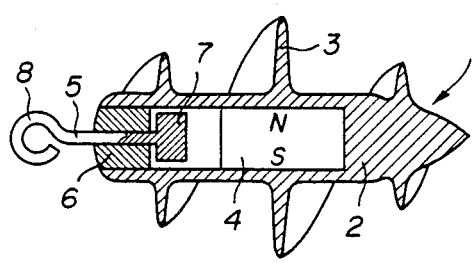
FIG. 1 is a longitudinal section of a rotator equipped with a magnet according to a first embodiment of the apparatus according to the invention.

FIG. 1 shows a rotator 1 comprising a single, integral body with an elongated, axially recessed, central part 2 and a dual helical blade 3 having a pitch equal to 25 mm. This body is made of synthetic material. A cylindrical permanent magnet 4 is placed in the axial recess of the rotator body. This magnet is polarized transversely across a diameter of the cylinder and it may be bipolar or multipolar. The front part of the rotator 1 comprises a pivot having a metallic spindle 5 which rotates freely in an axial bore of a cylindrical sleeve 6. This sleeve 6 is made of a synthetic material, is fixed in the axial recess of the rotator body, and may be advantageously made of synthetic corundum or the like.

Within this recess, the pivot spindle 5 comprises a stop 7 which may bear against the end of the sleeve 6. The other end of the spindle 5 is bent in the form of a hook 8 to allow the rotator to be easily hooked onto the craft. The materials used for the spindle 5 and the sleeve 6 are selected so as to provide a low coefficient of friction.

Figure 2:
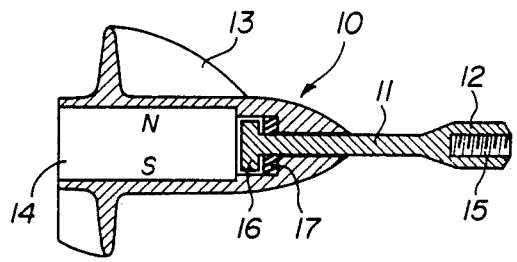
FIG. 2 is a similar view to FIG. 1 representing a rotator according to another preferred embodiment of the invention.

The rotator 1 with a relatively low pitch is designed for measuring low and moderate speeds which are generally employed with a saifboard. It is optimally suitable for detecting speeds included between 0.5 and 10 knots. For measurement in a higher speed range, a rotator such as shown in FIG. 2 may be utilized. This rotator 10 comprises a dual helical blade 13 whose pitch is equal to 100 mm for example. This rotator 10 thus turns five times more slowly than the rotator 1 and exhibits much lower wear at high speeds. As a rule, its magnet 14 is identical with that of the rotator 1, although a multipolar magnet is particularly advantageous to faciliatate the measurement of low speeds. The rotator 10 is fixed by means of a spindle 11 having a head 12 which is provided with a threaded bore 15 and comprises at its end opposite to the head a stop 16 arranged to bear against a stop 17.

A great part of the rotator may be made of a light material and it may also comprise sealed recesses, so that it may present a mass per unit volume about equal to that of water. Thus, the rotator attached to the craft is oriented in the direction of water flow already at low speeds.

Figure 3:
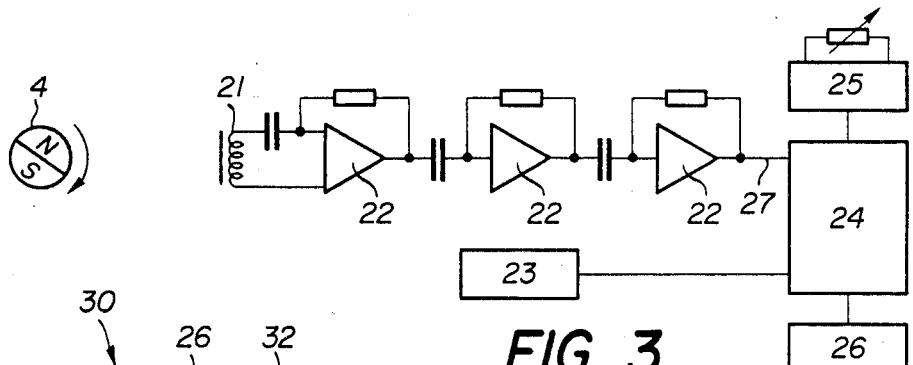
FIG. 3 is a block diagram of the measuring device.

The measuring device represented in the block diagram of FIG. 3 is adapted to be disposed on board the craft, at a distance from the magnet 4 which may attain several decimeters. To detect at a fixed point on the craft the periodic magnetic field variations caused by rotation of the magnet 4, the device comprises a coil 21 having several ten thousands of turns and a magnetizable core. In the example here described, the coil 21 comprises 20,000 turns of copper wire of 0.02 mm diameter. The slight voltage induced in the coil 21 is greatly amplified by a chain comprising in this case three amplifying devices, for example operational amplifiers 22 with a very low current consumption. Each of the operational amplifiers 22 is combined with a filter circuit in order to eliminate the low frequency component developed by the coil during its own movements in the earth magnetic field. A battery of photovoltaic cells 23 exposed to ambient light powers the measuring device assembly. When the magnet 4 undergoes rotation, this assembly produces, at the output of the last operational amplifier, a square electrical signal whose frequency corresponds to the rotator speed of rotation.

This square signal is transmitted to a frequency meter 24 known per se, which is connected to a quartz time base 25 or an adjustable time base to allow calibration of the apparatus. The frequency meter 24 comprises a decoder which controls a liquid crystal display unit. The frequency meter assembly is carried out by means of circuits of the CMOS type with very low energy consumption in order to obtain a low power supply by the photovoltaic cells 23.

Figure 4:
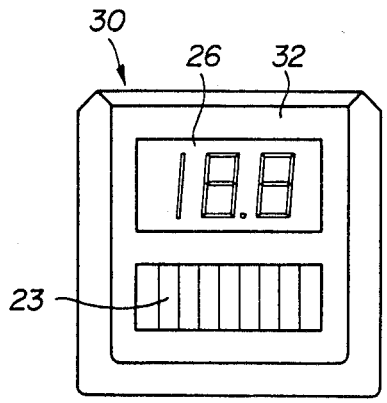
FIG. 4 is a front view of the box enclosing the measuring device.
Figure 5:
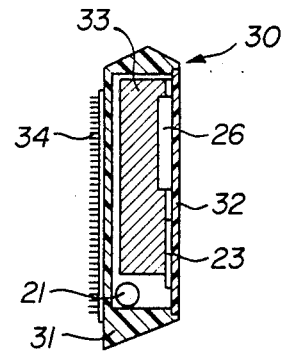
FIG. 5 is a schematic section of the box of FIG. 4.

The sealed box 30 shown in FIGS. 4 and 5 encloses the entire measuring device illustrated in FIG. 3. It comprises a body 31 of generally flattened shape, having a frontal opening which is closed off by a transparent plate 32 tightly sealed on the body of the box. The body 31 and the transparent plate 32 are preferably made of synthetic material.

The front face of the box 30 represented more particularly in FIG. 4 shows behind the transparent plate 32 a display unit 26 and the battery of photovoltaic cells 23.

The electronic circuit may be embedded in a block of resin 33 which is placed in the box 30, as well as the coil 21. It may likewise be adheringly fixed to the bottom of the box to render the assembly insubmersible and hence to decrease the risk of loss.

The box 30 in this example is designed so as to be removably mounted. Its size is in fact smaller than a pack of cigarettes and its slight weight allows the utilizer to readily carry it in a pocket when leaving the boat, and to thus protect his apparatus from theft or tampering. To this end, the back of the box 30 comprises a device 34 for rapid fastening, of known type, which is attached by pressure onto a corresponding device fixed to the boat at the desired place. This fastening device likewise facilitates transfer of the apparatus from one craft to another.

Figure 6:
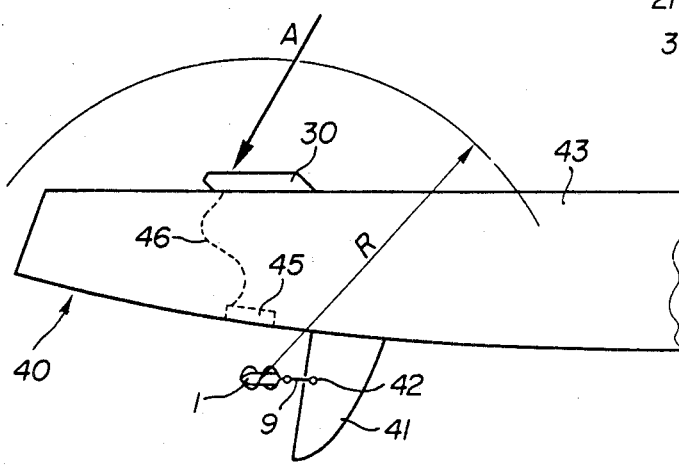
FIG. 6 is an example of an arrangement of the apparatus on a sailboard.

FIG. 6 schematically illustrates a preferred arrangement of the apparatus according to the invention on a sailboard 40. The rotator 1 is attached by means of a fastener 9 of known type, for example a threaded element and a flexible wire, to a rear fin 41 of the board, this fin being pierced with a hole 42 in the vicinity of its trailing edge.

The box 30 enclosing the measuring device and more particularly the display device is fixed to the upper surface 43 of the sailboard so as to be plainly visible to the navigator. The maximum distance between the box 30 and the rotator 1 may vary more particularly as a function of the lowest speed to be measured. In the example of the embodiment here described, it is found that a rotator 1 with a pitch of 25 mm and a bipolar magnet of samarium-cobalt for example, this maximum distance is about 25 cm for a lower speed threshold of one knot. If it is sufficient to measure the speed from 2 knots upwards, this maximum distance is greater than 50 cm. In the case of FIG. 6, it may be seen that a radius R equal to 50 cm allows the position of the box to be freely selected in a relatively extensive zone, while allowing the navigator to read, in the direction of the arrow A, the speed displayed by the apparatus.

It may be pointed out in this connection that tests effected with another variant of an embodiment comprising more particularly a magnet with superior characteristics, have shown that the apparatus could operate in a sufficiently precise manner when the distance between the magnet and the coil is increased up to a value of 1.7 m.

Due to the fact that the box 30 may be permanently sealed thanks to the power supply by the photovoltaic cells, it may be embedded in the upper part of the sailboard structure during its construction, the front face of the box being flush with the upper surface of the board. With this arrangement, the box is perfectly protected against shocks, loss or theft.

As is shown in the above description, the apparatus according to the invention is particularly adapted to allow measurement of the speed of a sailboard. However, it may likewise be used advantageously for measuring the speed of a light dinghy with a single or double hull, or even of a larger craft, providing that the measuring device be placed at a distance with respect to the rotator 1 which is smaller than the maximum radius R and that the hull of the craft not be ferromagnetic. On light craft, it will be particularly appreciated that the rotator and the box of the apparatus are readily removable and interchangeable. On larger craft, it may be advantageous to dissociate the measuring and display functions in two different boxes, while transmission of the results between the two boxes may be effected for example by a cable or by ultrasound. In such a case, the display unit may be incorporated in an instrument panel or carried for example on the wrist of the navigator.

Combined with an adequate sensor equipped with a magnet, an identical measuring apparatus may be utilized to measure and display the speed of the wind, of a skier, a bicycle, a hang-glider, an aircraft of the ULM type, or of any vehicle which has no electric current source. In that case, the box 30 remains unchanged, but the rotator represented in FIGS. 1 and 2 is replaced by a rotator with multiple blades mounted on a rotatable axle carried by perforated stones serving as bearings, mounted on a support.

In case the box is mounted on a dinghy, at a distance greater than the radius of magnetic emission, one may place at the bottom of the dinghy a detector 45 such as represented by broken lines in FIG. 6, which is connected by a cable 46 to the box 30.

What is claimed is:

1. In apparatus for measuring and displaying the speed of a craft, especially of a sailboard, comprising an immersed rotator which is pivotally mounted and arranged to be drawn by the craft, at least one permanent magnet integral with the rotator, its poles being diametrically opposite with respect to the axis of rotation of the rotator, and a measuring device equipped with a display unit and arranged to be mounted on the craft, the improvement wherein the measuring device comprises a coil having at least 2,000 turns and arranged to induce an electrical signal which represents magnetic field variations generated by rotation of the magnet, at least one amplifying device for amplifying said signal while eliminating very low frequencies, and a frequency meter for determining the frequency of said signal after amplification.

2. Apparatus according to claim 1, comprising a source of continuous current consisting of a battery of photovoltaic cells or other long-life cells.

3. Apparatus according to claim 2, comprising a display unit of the liquid crystal type.

4. Apparatus according to claim 3, comprising a sealed box provided with a transparent window, said box enclosing the whole measuring device including said source of continuous current.

5. Apparatus according to claim 1, comprising a rotator of synthetic material, said magnet being accomodated within said rotator.

6. Apparatus according to claim 5, comprising a sealed box provided with a transparent window, said box enclosing the whole measuring device and including a source of continuous current.

7. Apparatus according to claim 1, comprising a sealed box provided with a transparent window, said box enclosing the whole measuring device and including a source of continuous current.

8. Apparatus according to claim 7 associated with a sailboard, wherein said box is embedded in the upper part of the sailboard out of the water and on the opposite side of a hull of the sailboard with respect to the rotator.

9. Apparatus according to claim 7, comprising a detector connected to said box and placed in the field of magnetic action of the magnet of said rotator, said box being disposed outside said field.

* * * * *